United States Patent

[11] 3,610,569

| [72] | Inventor | Henry V. Reaves |
| | | Cincinnati, Ohio |
| [21] | Appl. No. | 863,150 |
| [22] | Filed | Oct. 2, 1969 |
| [45] | Patented | Oct. 5, 1971 |
| [73] | Assignee | Xomox Corporation |
| | | Cincinnati, Ohio |

[54] FLUID CONTROL VALVE WITH RETRACTABLE BODY SEAT
6 Claims, 11 Drawing Figs.

[52] U.S. Cl. .................................................. 251/62,
 251/159, 251/172, 251/196, 251/317
[51] Int. Cl. .................................................. F16k31/163
[50] Field of Search ......................................... 251/159,
 171, 172, 196; 251/207, 315, 317, 62

[56] References Cited
UNITED STATES PATENTS

| 2,370,751 | 3/1945 | Prager | 251/159 |
| 2,600,898 | 6/1952 | Maxwell | 251/159 |
| 2,796,230 | 6/1957 | Grove | 251/172 |
| 3,007,490 | 11/1961 | Passmore | 251/159 X |
| 3,044,741 | 7/1962 | Grove | 251/172 X |
| 3,047,024 | 7/1962 | Schuller | 251/159 X |
| 3,065,951 | 11/1962 | Fennema | 251/172 |
| 3,109,457 | 11/1963 | Oliveau | 251/159 X |

Primary Examiner—Harold W. Weakley
Attorney—J. Warren Kinney, Jr.

ABSTRACT: The control valve is provided with a normally stationary body seat which is retractable from the moveable valving member, to free said valving member of frictional resistance to movement in advance of disposition of the valving member to open or closed positions. The retractable seat of the valve body is designed for prolonged and efficient trouble-free service.

INVENTOR
HENRY V. REAVES
BY J. Warren Kinney Jr.
ATTORNEY

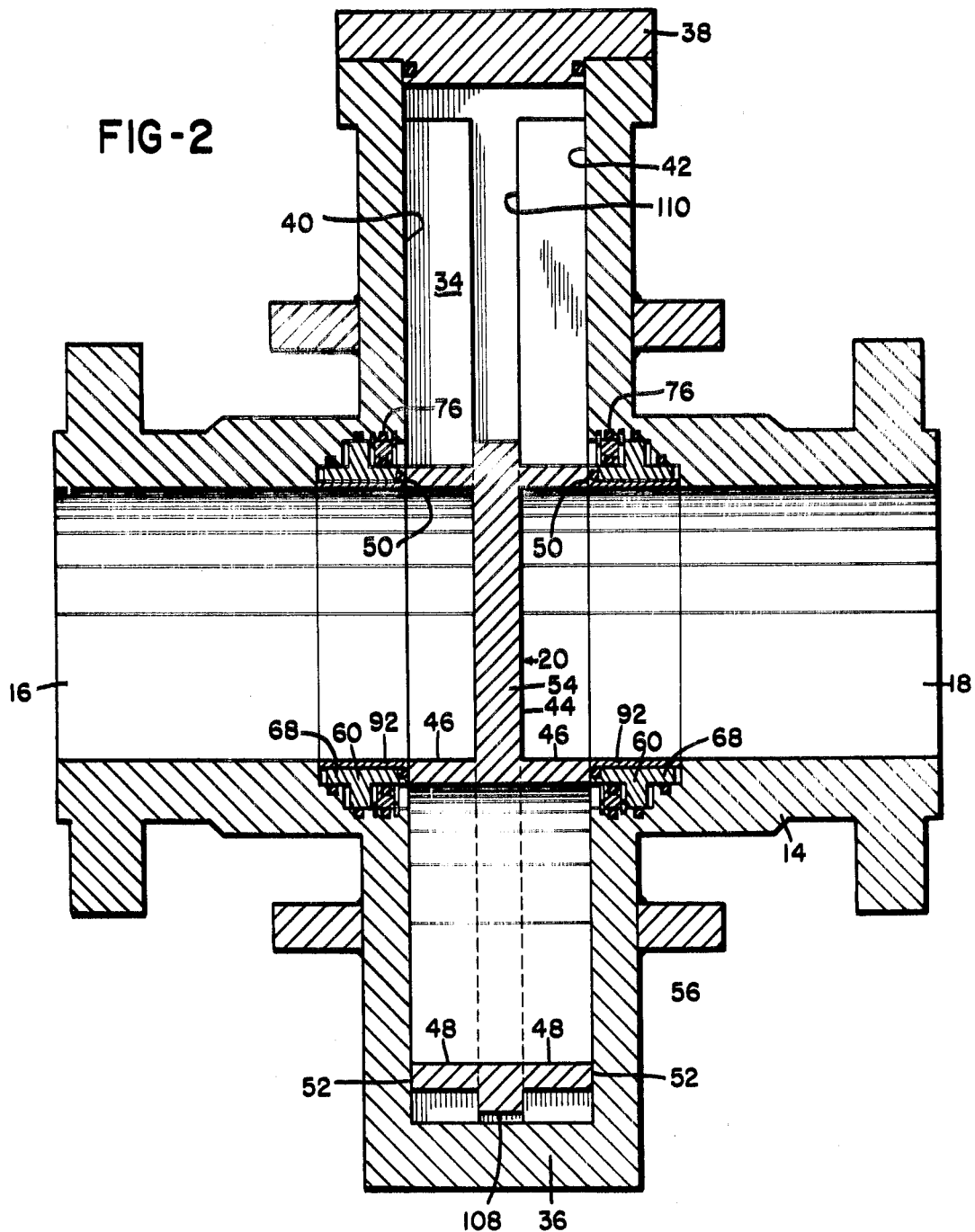

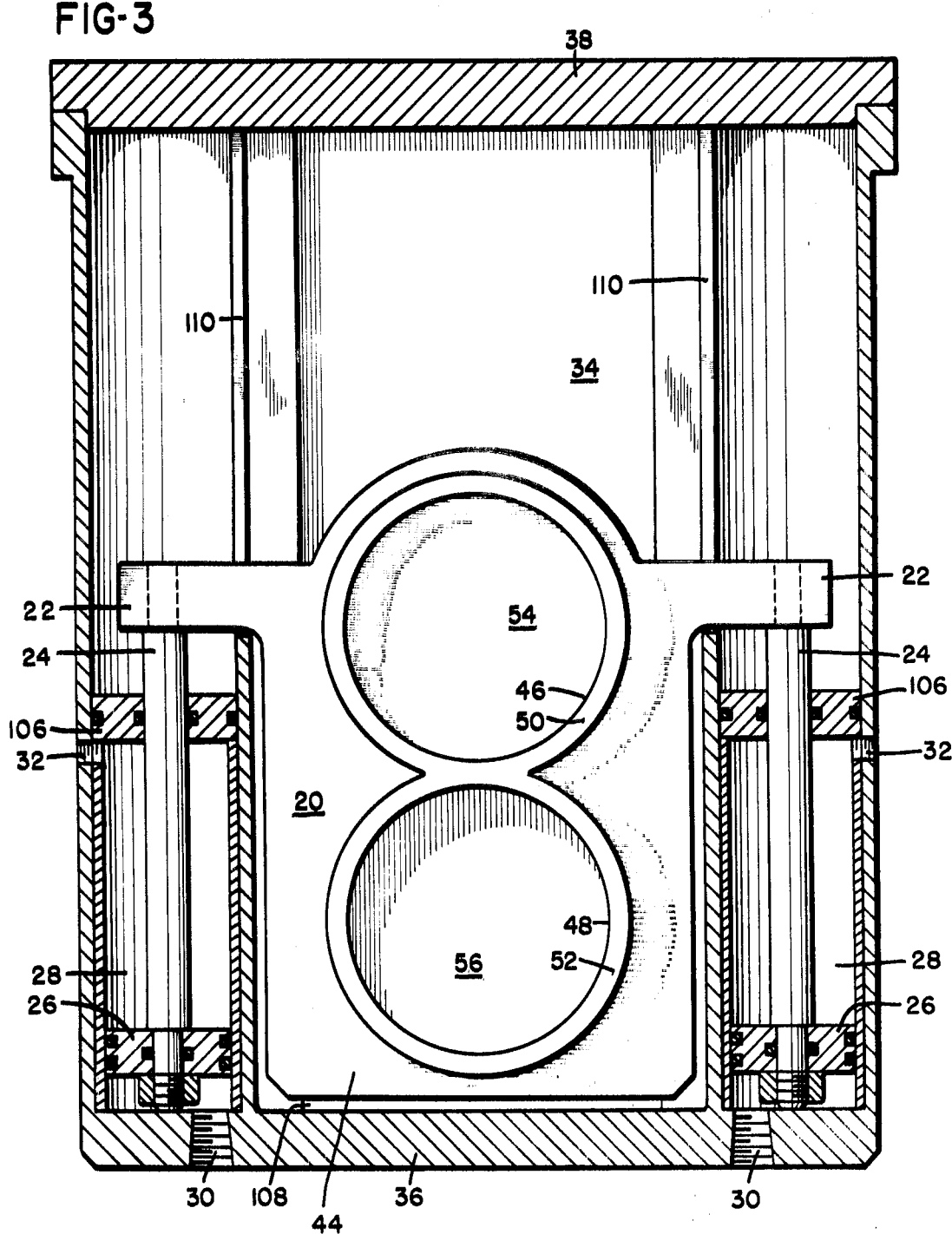

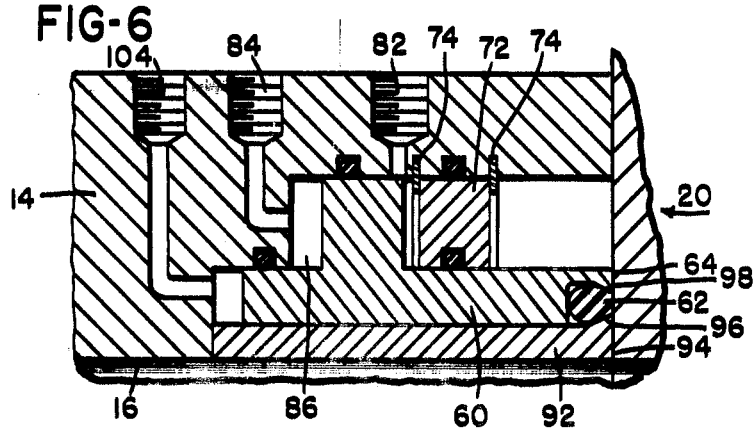
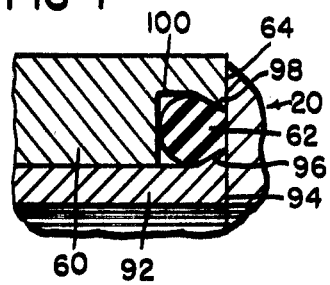
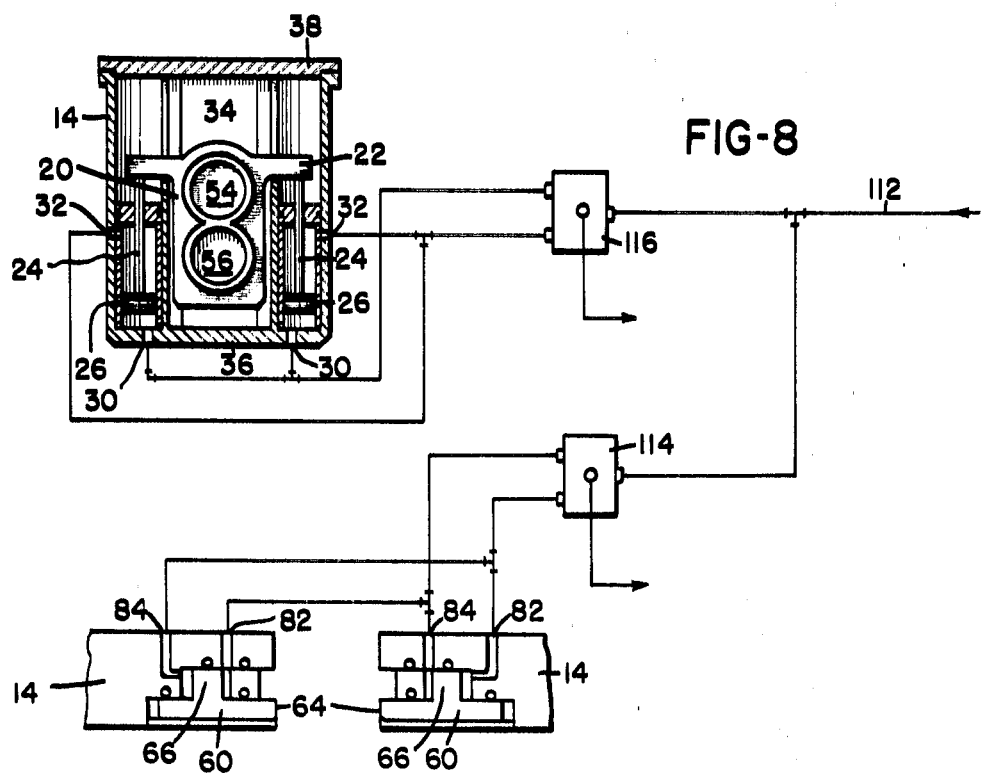
INVENTOR
HENRY V. REAVES

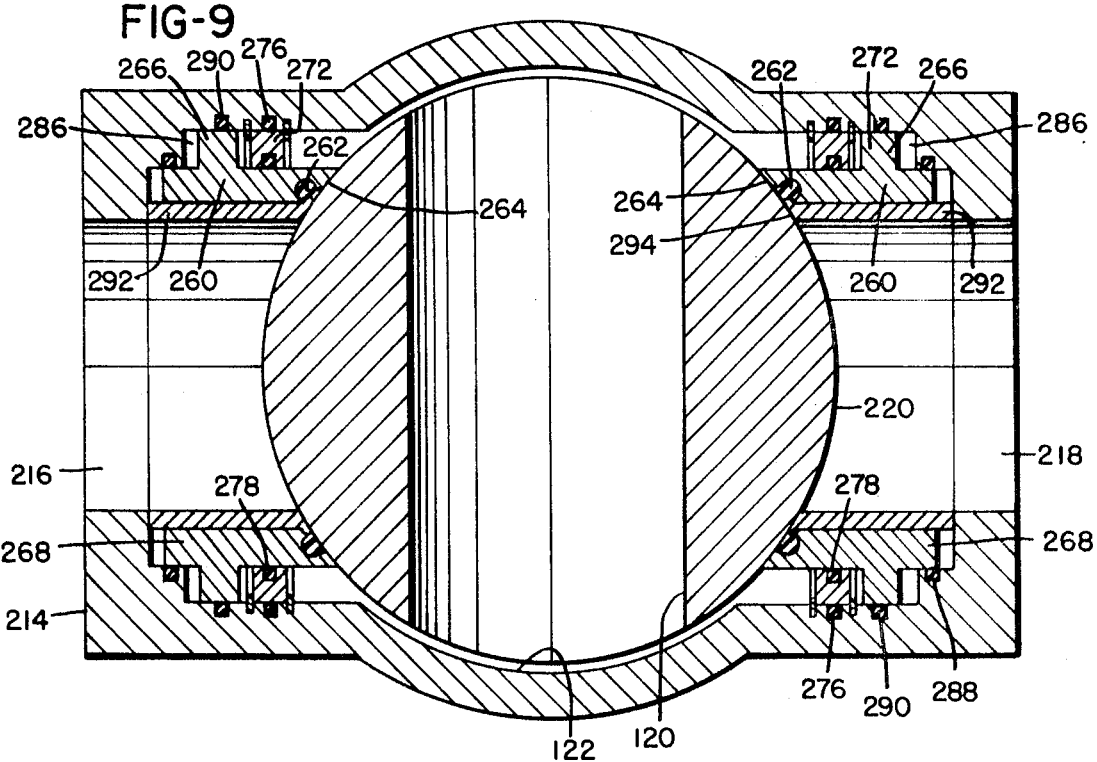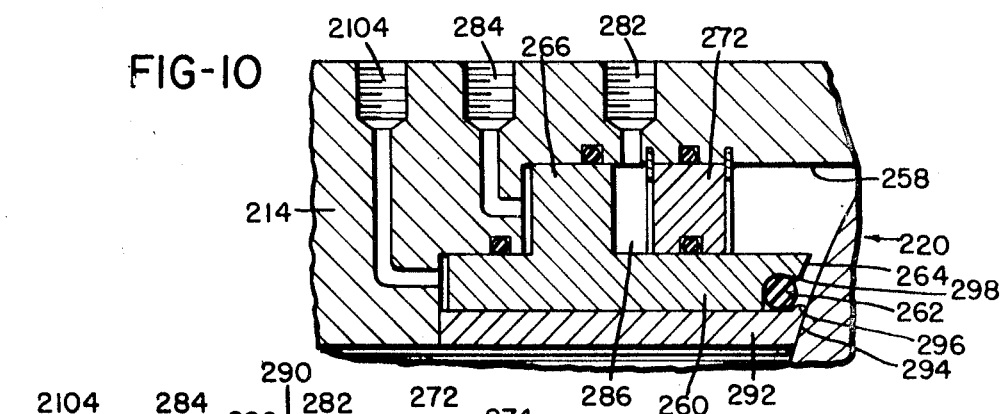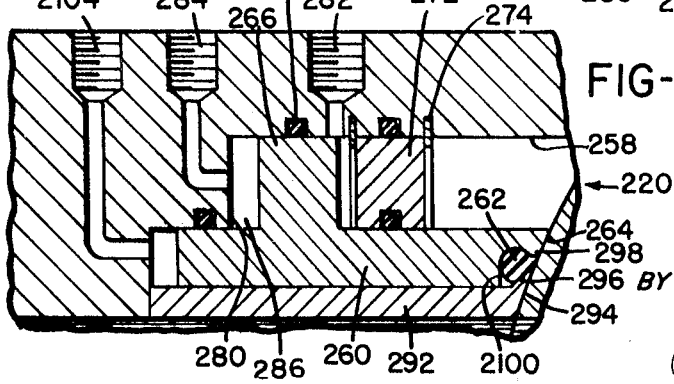

FLUID CONTROL VALVE WITH RETRACTABLE BODY SEAT

This invention relates to a valve having a retractable body seat or seats, whereby the normally movable valving member of the valve may be relieved of frictional drag incident to shifting of the valving member between closed and open positions.

In the case of large fluid control valves, and particularly those in control of highly pressurized fluids, considerable force or power is required in seating and unseating the valving member due to opposition of frictional drag, or in some cases, the inherent great weight of the valving member and parts movable therewith. The valving member sometimes is shiftable manually, or it may be shifted by power means to the seated and unseated positions. In either case, it is considered desirable to provide means whereby ease of operation of the valve is facilitated and expedited.

An object of the present invention is to facilitate and expedite operation of a fluid control valve, with the use of simple, effective, and durable means of a highly serviceable nature.

Another object of the invention is to attain the desired expeditious and facilitated operation of the valve, by providing body seats that may be retracted from contact with the movable valving member of the valve whenever the valving member is to be shifted between the open and closed positions.

A further object of the invention is to prolong materially the service life of valve seats and valving members in a valve of the character mentioned.

Another object is to provide in a valve of the kind mentioned, means for obtaining a superior seal against undesirable leakage of fluid through the valve when closed.

The foregoing and other objects are attained by the means described herein and illustrated upon the accompanying drawings in which:

FIG. 2 is a vertical section taken on line 2—2 of FIG. 1.

FIG. 3 is a transverse cross section of FIG. 2.

FIG. 6 is a view similar to FIG. 4, showing the body seat advanced against the valving member in sealing condition.

FIG. 7 is a view similar to FIG. 5, showing in detail the nose contact of the seat with the valving member.

FIG. 8 is a view similar to FIG. 3, on a reduced scale, showing schematically a fluid system for actuating the gate valve.

FIG. 9 is a cross section taken on a horizontal plane, showing a plug valve or a ball valve embodying the improvements of the present invention, the valving member thereof being in closed position, with the body seats in sealing contact against the valving member.

FIG. 10 is an enlarged fragmental cross section taken through the retractable seat assembly of FIG. 9, and showing the body seat retracted from the seating face of the valving member.

FIG. 11 is a view similar to FIG. 10, showing the body seat advanced into sealing contact with the valving member.

Figure 1:
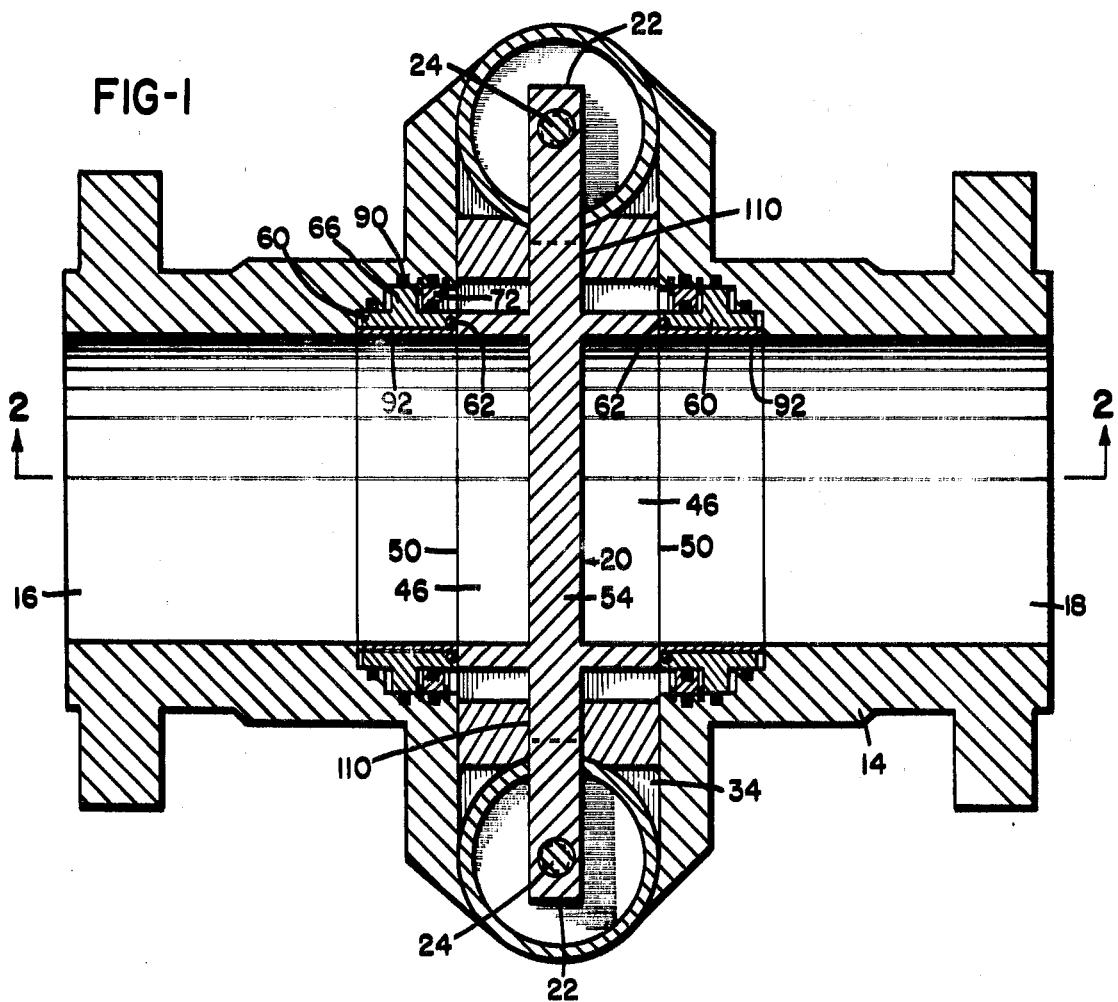
FIG. 1 is a cross-sectional view of a gate valve embodying the present invention, the valve being in closed position.

The present invention is applicable to various types of valves, such as the gate valve of FIGS. 1 to 8, and the plug or ball-type exemplified by FIGS. 9 to 11. The gate valve will be described first, as depicted by FIGS. 1 through 8 wherein the numeral 14 indicates the molded valve body having an inlet port 16 and an outlet port 18 through which a flow of fluid is controlled by means of a movable or adjustable valving member 20.

The valving member 20, as best shown in FIGS. 3 and 8, may be constructed as a block having arms 22, 22, serving as a crosshead to which are connected the piston rods 24, 24. Pistons 26, 26 secured to the rods, are reciprocable within cylinders 28, 28 by force of fluid introduced to the cylinders through ports 30, 30 or ports 32, 32, for shifting the valving member 20 between closed and open positions between the inlet and outlet ports of the valve body.

Intermediate the inlet and outlet ports of the valve body, the body may be enlarged to provide a chamber 34 within which the valving member 20 may be shifted, as by means of the pistons 26. Chamber 34 had a bottom wall 36 and an upper cap or cover 38 defining opposite ends of the chamber. The chamber has two opposite walls 40 and 42 which are planar and parallel, presenting smooth faces between which the valving member may slide. The inlet port 16 terminates in wall 42.

The block constituting the valving member 20 may comprise a flat plate 44 carrying four circular seat bosses 46, 46, and 48, 48 two thereof being located upon each face of the plate. The circular bosses 46 and 48 extend equal distances laterally from plate 44, and have flat circular seats 50 and 52 of approximately the same diameter as the body inlet and outlet ports at their inner termini, as will be explained in greater detail. The circular seats or seating faces 50, 52 and 50, 52, have a free sliding fit between the chamber walls 40 and 42, and by shifting the valving member to either limit within chamber 34, the seats 50 or the seats 52 selectively may be caused to register with the inner ends of the body ports 16 and 18.

As is best illustrated by FIG. 2, the bosses 46, 46 are spanned by a solid web or wall 54, which will bar the flow of fluid through the body ports, as shown. On the other hand, the bosses 48, 48 are communicative with one another, and define a through opening or port 56 of the valving member. Accordingly, the valving member in the lowered position shown, bars the flow of fluid through the valve; but if the valving member be elevated within chamber 34 to the extent of registering its port 56 with the body ports 16 and 18, fluid may flow freely through the valve. The aforesaid alternative positions of the valving member are designated the closed and the open valve positions, respectively.

Means is provided for establishing a fluidtight seal between the seats of the valving member and the seats of the valve body, and for relaxing said seal when the valving member is to be shifted, thereby to facilitate and expedite movements of the valving member by reducing frictional drag thereon. Such means involves the provision of retractable body seats to be displaced from contact with the valving member when the latter is to be shifted to either the open or the closed position. Since the retractable seat at the inlet port 16 may be identical to that located at the outlet port 18, a description of one will suffice for the other also.

Figure 4:
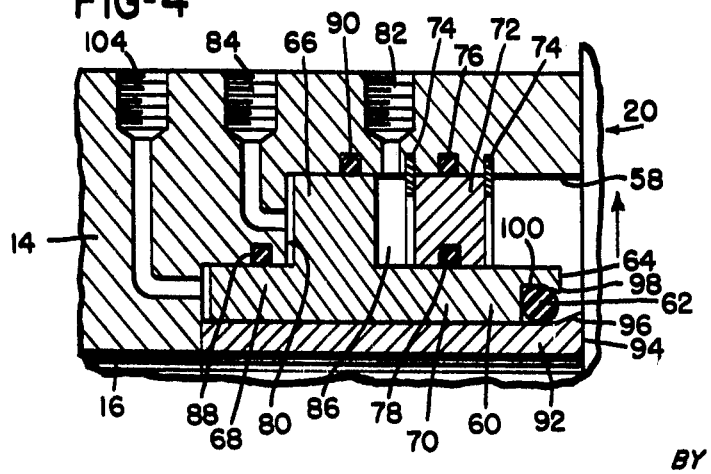
FIG. 4 is an enlarged fragmental cross section detailing a retractable body seat illustrated upon FIG. 2, the seat being shown retracted and out of contact with the movable valving member.
Figure 5:
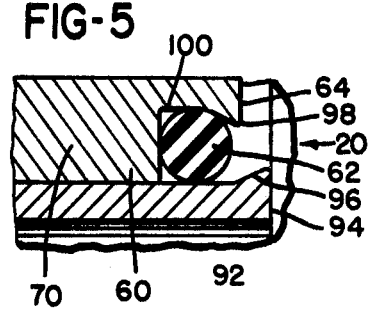
FIG. 5 is an enlarged fragmental cross section of the nose end of the retracted seat of FIG. 4.

Referring to FIGS. 1 and 4, the inner end of body port 16 is seen to have a counterbore 58 in which is slidingly supported a tubular seat carrier 60 adapted to carry a resilient seal ring 62 located at the nose end 64 of the carrier. The carrier may be provided with a radially outwardly extended flange 66, flanked by cylindrical portions 68 and 70 of reduced diameter. Carrier 60 is supported in bore 58 for limited movement axially of the inlet port, either toward or from valving member 20. Advancement of the carrier toward the valving member may be limited by a retainer ring 72 fixedly supported in bore 58. The retainer ring may be located and held by suitable spring retainers 74 removably anchored in bore 58. O-rings 76 and 78 seal the retainer ring 72 against fluid leakage past the retainer ring.

In the direction of retraction of carrier 60, movement thereof may be limited by the bottom of bore 58, as at 80, or otherwise as may be desired.

In a preferred construction of the valve, fluid under pressure may be employed to advance and retract the seat carrier 60. To this end, the valve body may be provided with fluid ports 82 and 84 arranged to direct pressure of fluid to either side of flange 66, while exhausting the fluid from the remaining side of the flange. Flange 66 moves in chamber 86, and operates as a piston. Undesired leakage of fluid from chamber 86 may be sealed off by means of O-rings or gaskets 88 and 90.

The sleeve denoted 92 is a floating seal protector which has a nose end 94 provided with an outward flare or incline 96 onto which the seal member 62 may ride as the carrier advances the seal member toward valving member 20. An inwardly directed annular lip 98 on carrier nose 64 normally retains seal member 62 within the confines of nose socket 100, and prevents displacement of the seal member from the annular socket as carrier 60 is retracted to the left in FIG. 4.

When carrier 60 is advanced to the right according to FIG. 6, as by introduction of fluid pressure into port 84, the nose end 64 of carrier 60 will seat against valving member 20, while at the same time the resilient seal member 62 will be cramped or squeezed between the inclines 96 and 98, distorted, and firmly projected against valving member 20 to effect therewith a fluidtight seal. During the fluid advancement of carrier 60, FIG. 6, the forward end of chamber 86 will exhaust through port 82, as will be understood. Pressure of fluid will be maintained in port 84 and in the rear end of chamber 86, during normal functioning of the valve; but when the valving member or gate 20 is to be moved, pressure of fluid may be introduced to port 82 while port 84 exhausts, in order to retract the seal member 62 and body seats or nose 64 from contact with the valving member 20. The nose end 64 constitute retractable valve seats carried by the body of the valve.

By displacing the retractable seats during opening or closing movements of the gate or valving member, frictional drag is eliminated and the valving member may be moved to open or closed position with ease and dispatch. Moreover, wear of the seating surfaces thereby is greatly reduced, resulting in prolonged trouble-free efficient service.

In FIGS. 4 and 6, the numeral 104 indicates a port or passageway through which a lubricant or a sealant may be introduced to the retractable seat assembly, if desired. In FIG. 3, the numerals 106, 106 indicate heads for the power cylinders 28, 28, and at 108 is indicated a stop on the bottom of the valving member 20 to limit lowering of the valving member within its chamber 34. The valving member may be guided in its movements by means of stationary guide slots 110, 110 in chamber 34, which slidingly accommodate the crosshead 22, 22 of the valving member.

With reference now to the schematic view, FIG. 8, there is shown a source 112 of pressured fluid, either gaseous or liquid, feeding two four-way valves 114 and 116. Valve 114 may be manipulated in any acceptable manner, to send a charge of pressurized fluid to valve ports 82, 82 of the retractable seat assembly, with exhaust occurring through ports 84, 84 thereof, for the purpose of retracting the carriers 60, 60 and their body seats from contact with the movable valving member of valve 114. Thereafter, four-way valve 116 may be manipulated to send pressurized fluid to valve ports 30, 30, with exhaust occurring through ports 32, 32 of valve 14, to activate the pistons 26, 26 for elevating valving member 20 to the open position.

The valve 14 thereafter may be closed by manipulating the four-way valve 116 to reverse the flow through ports 30, 30 and 32, 32; after which the retractable seats may be restored to sealing position by manipulating the other four-way valve 114 to fluid-advance the seat carriers 60, 60 toward the valving member 20 of valve 14.

FIGS. 9, 10 and 11 illustrate the means of the present invention incorporated in a plug valve or a ball valve; and in these drawing views all parts which correspond to parts incorporated in FIGS. 1 through 8 will be identified by the same numerals but bearing the prefix "2." Thus, for example, seat carrier 60 of FIGS. 1 through 8, will be denoted 260 in FIGS. 9 through 11. Seat carrier 60 will be seen to be identical to seat carrier 260, operating in the same way to to withdraw from the movable valving member whenever said valving member is to be moved to open or closed position.

In FIG. 9, the movable valving member is denoted 220, and it may be either a rotary plug or a ball of ordinary design having the usual through port 120 registrable with the inlet and outlet ports of the valve body. The plug or ball may be rotated manually or by power means, as required. As shown, the valving member has ample clearance in its confining body chamber 122, although the clearance is shown exaggerated in FIG. 9.

When the valving member 220 is to be rotated, fluid pressure is employed to retract the carriers 260, 260 from contact with the valving member, as explained in the description of FIGS. 1 through 8, thereby relieving the valving member of frictional drag opposing rotation thereof. After the valving member has been rotated to the desired position, the carriers may be returned to seated and sealed relationship with the valving member, using fluid pressure to advance the carrier as previously explained.

In all forms of the valve, the seal members such as 62 and 262 are of a relatively soft, resilient, wear-resistant material having sealing characteristics, and the retractable carriage which embraces each seal member has a forward nose 64 or 264 performing as a body seat to contact the movable valving member and limit the extend to which the seal member may be pressed against the valving member. The inclines formed by the lips portion 98 and the flared portion 96 of the carriage assembly, will act as the carriage advances, to reduce the size of chamber 100. This results in distorting the seal member 62, causing a portion thereof to project with some force against the sealing surface of the movable valving member. When the carriage is retracted as in FIG. 4, the seal member 62 is disposed wholly within the carriage nose chamber 100, and is thereby protected from any high-speed flow of fluid passing through the valve. Additional protection for the seal member is afforded by the projected flared end 94 of protective sleeve 92. All of the foregoing applies to the valve of FIGS. 9 to 11, as well as to the valve of FIGS. 1 to 8.

It is possible in fabricating the valve, to omit one of the retractable carriage assemblies and permit the single remaining carriage assembly to perform the functions of both carriage assemblies. Such use of a single retractable carriage assembly would of course relieve the movable valving member of frictional drag according to one of the objectives of the invention.

The valving member as well as the retractable carriage of the valve, may be moved or actuated with the use of means other than fluid pressure, if desired. The various parts of the valve exposed to the fluid being controlled, may be of metal or other materials resistive of any destructive elements carried by the fluid controlled.

What is claimed is

1. A fluid control valve comprising a valve body having inlet and outlet ports, and an intermediate chamber communicative with the ports, a movable valve member in the chamber and movable between open and closed positions relative to the ports, the valve member having seat means thereon and movable therewith, at least one of the ports having a counterbore therein adjacent the chamber, normally stationary retractable body seat means mounted in the counterbore, the body seat means comprising a carrier movable between positions in engagement with and out of engagement with the valve member seat means, sealing means mounted between the carrier and the body to effectively seal the carrier, a flange on one surface of the carrier having free side portions and extending beyond the carrier, the flange being movable with the carrier, abutment means fixedly mounted within the counterbore and limiting the movement of the carrier and flange in one direction, the counterbore limiting the movement of the carrier and flange in the other direction, sealing means between the abutment means and the carrier to effectively seal the same, the carrier having a nose portion on an outer end thereof, sealing means within the nose portion, retaining means on the nose portion retaining the seal within the nose portion, a sleeve fixed within the counterbore and inwardly of the carrier and supporting the carrier within the counterbore, the sleeve having a nose portion on an outer end thereof, retaining means on the sleeve nose portion and cooperating with the retaining means on the carrier nose portion to retain the last mentioned seal means, separate pressure actuator means acting on either of one of the free side portions of the flange to effect movement of the carrier into and out of engagement with the valve member seal means, the carrier nose portion when moved into engagement with the valve member seal means causing the seal means in cooperation with the sleeve nose portion to be compressed and forced into engagement with the valve member seat means thus sealing the engagement of the valve member seat means with the body seat means, and when pressure is applied to move the carrier nose portion and seal means out of engagement with the valve member seat means, frictional drag on the valve member is eliminated whereby the valve member may be moved to open and closed positions with ease and also wear on the body seat means is greatly reduced.

2. The valve as set forth in claim 1 wherein the valve body has spaced port openings and leading to each side of the flange, means for applying fluid pressure through the port openings to either of the free side portions of the flange to move the flange and the carrier with the body seat means.

3. The valve as defined in and by claim 1 wherein the retaining means on the carrier nose portion and the sleeve nose portion comprise inwardly directed inclines extending toward each other.

4. The valve structure as set forth in claim 2 wherein the valve member is a sliding valve, fluid-pressure-operated means associated with the sliding valve to move the same between open and closed positions.

5. The valve structure as set forth in claim 2 wherein the valve is a rotary valve, means associated therewith for rotating the valve between open and closed positions.

6. The valve as set forth in claim 1 wherein the valve body has spaced port openings and leading to each side of the flange, means for applying fluid pressure through the port openings to either of the free side portions of the flange to move the flange and the carrier with the body seat means and the retaining means on the carrier nose portion and the sleeve nose portion comprise inwardly directed inclines extending toward each other.